US012094438B2

(12) United States Patent
Katzenberger

(10) Patent No.: US 12,094,438 B2
(45) Date of Patent: Sep. 17, 2024

(54) ACOUSTIC WAVEGUIDE GUITAR

(71) Applicant: Joseph J. Katzenberger, Crawfordsville, IN (US)

(72) Inventor: Joseph J. Katzenberger, Crawfordsville, IN (US)

(73) Assignee: Joseph J. Katzenberger, Crawfordsville, IN (US)

( * ) Notice: Subject to any disclaimer, the term of this patent is extended or adjusted under 35 U.S.C. 154(b) by 317 days.

(21) Appl. No.: 17/735,818

(22) Filed: May 3, 2022

(65) Prior Publication Data

US 2023/0360617 A1 Nov. 9, 2023

(51) Int. Cl.
*G10D 1/08* (2006.01)
*G10D 3/02* (2006.01)

(52) U.S. Cl.
CPC ................. *G10D 1/08* (2013.01); *G10D 3/02* (2013.01)

(58) Field of Classification Search
CPC ............. G10D 1/08; G10D 3/02; G10D 1/085
See application file for complete search history.

(56) References Cited

U.S. PATENT DOCUMENTS

| | | | |
|---|---|---|---|
| 3,656,395 A | 4/1972 | Kaman | |
| 3,892,159 A | 7/1975 | Houstma | |
| 4,987,815 A | 1/1991 | Shockley | |
| 5,208,410 A | 5/1993 | Foley | |
| 5,333,527 A | 8/1994 | Janes | |
| 5,461,958 A | 1/1995 | Dresdner | |
| 5,549,027 A | 8/1996 | Steinberger | |
| 5,567,896 A | 10/1996 | Gottschall | |
| 5,661,252 A | 8/1997 | Krawczak | |
| 5,682,003 A | 10/1997 | Jarowsky | |
| 6,040,510 A | 3/2000 | Yuan | |
| 6,646,191 B1 | 11/2003 | Martin | |
| 6,833,501 B2 | 12/2004 | Jagmin | |
| 7,019,202 B1 | 3/2006 | Hetzel | |
| 7,446,247 B2 | 11/2008 | Shellham | |
| 9,502,006 B1 | 11/2016 | Galloup | |
| 10,686,839 B2 | 6/2020 | Xie et al. | |
| 11,232,770 B1 * | 1/2022 | Katzenberger | G10D 1/08 |
| 11,728,806 B2 | 8/2023 | Carstensen et al. | |
| 11,810,948 B2 | 11/2023 | Lee et al. | |
| 2014/0013929 A1 * | 1/2014 | El-Khadem | G10H 3/18 84/726 |

* cited by examiner

*Primary Examiner* — Kimberly R Lockett

(57) ABSTRACT

This invention is an acoustic guitar with two internal waveguides built into the guitar body. Each left and right waveguide is five feet long. The acoustic sound of the guitar is captured by a microphone, a piezo pickup, a pressure transducer pickup, a magnetic pickup under the strings, or any combination of these. It is then sent to an internal electronics package, including an amplifier and an equalizer, which sends the signal to left and right full range speakers. These speakers are mounted at the start of each waveguide. The sound then travels through each waveguide, which increases in size, similar to a horn, toward the end of the waveguide. One quarter wavelength of the lowest frequency is captured, and directed to multiple sound ports toward the end of the waveguides. The materials being considered for this guitar are Maple, Walnut, Rosewood, Mahogany, Sitka Spruce and Baltic Birch.

6 Claims, 5 Drawing Sheets

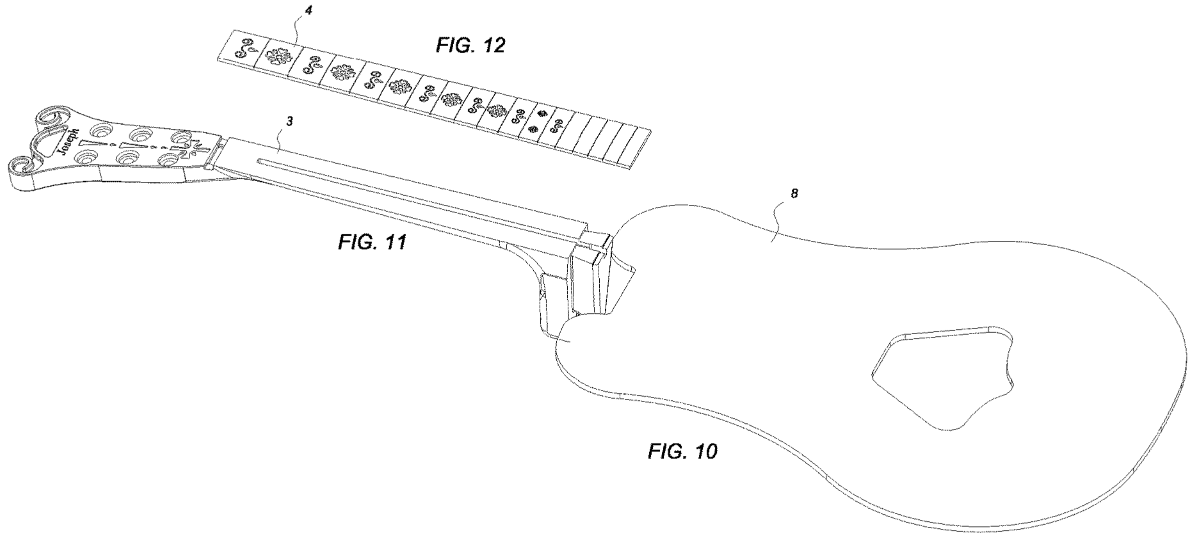
FIG. 12
FIG. 11
FIG. 10
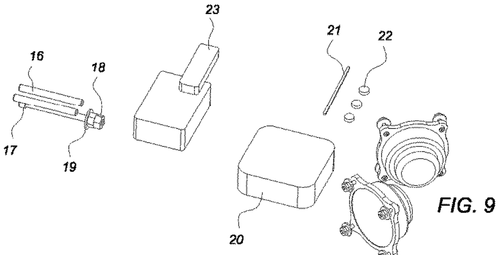
FIG. 9
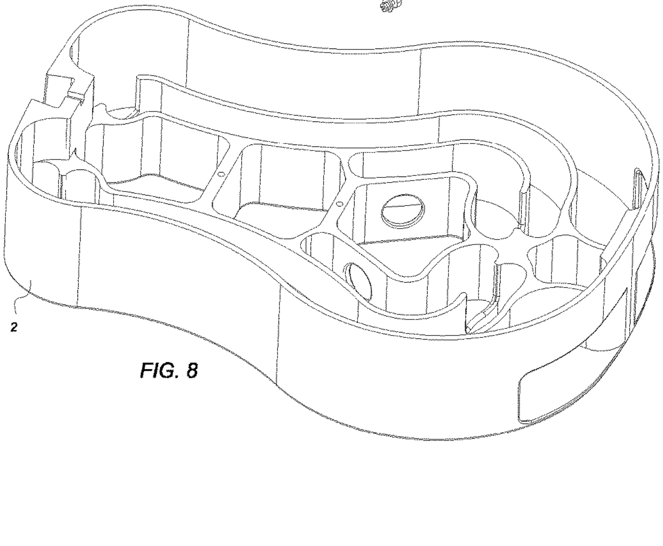
FIG. 8

ACOUSTIC WAVEGUIDE GUITAR

BACKGROUND OF INVENTION

This solves the problem of an acoustic guitar not having enough volume (or related beautiful tone due to this), in an acoustic environment, especially with other instruments. Classical guitars are not, and generally never have been included as a standard instrument in a symphony orchestra, due to lack of volume. Listen to an acoustic guitar being played with a violin, a piano, a banjo, and/or any brass instrument. The acoustic guitar can't be heard well, in an acoustic environment with other acoustic instruments. You can hear it within ten feet of the music. At twenty feet, thirty feet, and more, these other acoustic instruments can all be heard easily, but the acoustic guitar sound is greatly reduced. Other products include an acoustic/electric guitar that can be plugged into an amplifier. This type of guitar does not enhance the sound in any way (waveguide or other). My product is made to produce an acoustic, pure, beautiful sound, not needing external amplification or an electrical source (battery powered). That said, an external amplifier can be used, all options are included in this design.

The waveguides are inside the acoustic guitar, and can't be seen (except multiple ports). The guitar does not look any different from a standard acoustic guitar on the outside, other than the soundboard is three inches larger (longer) than a standard dreadnought guitar. It is radically different on the inside. It is heavier, so this difference will be noticed when the guitar is held. It is similar in weight to a heavy solid body electric guitar (classic older Gibson Les Paul). The guitar body is manufactured from high quality Rock Maple, Walnut, or other tonewood, available online (two 3"×18"×24" pieces laminated together). This will allow machining of the back and sides from one solid piece of material to form the guitar body, which we need for the unusual body shape/waveguide design, and also to minimize cost without affecting quality. The waveguides grow exponentially, and are somewhat similar in shape to a Saxophone, but the material is Rock Maple, or other tonewood. This guitar has an upper and lower internal chamber. The chamber divider itself encloses the waveguide shape. Everything above the chamber divider is the upper chamber. This is where a microphone or pickups can be placed, to capture the true acoustic sound of the guitar. The only way this can be manufactured is with computer numerical control programming and machining. A Luthier with standard guitar building tools can't build this guitar completely. That said, a Luthier is required to fit, hand work and assemble this guitar, to assure the highest levels of quality. This is a true combination of technology and craftsmanship. The goal is to build an acoustic guitar with increased volume, so the guitar player can easily play/vibrate the strings, resulting in a beautiful rich tone, not degraded by excessive force on the strings. The waveguide greatly contributes to superior sound due to concentrated sound waves. This produces a beautiful sound without losing sound wave energy, and increasing sound wave direction as it exits the guitar. It should be noted that all sound normally generated from the body of the guitar remains, and is actually enhanced due to the larger soundboard. This is all possible while being UNPLUGGED.

Other innovations include a thin and light (yet strong) soundboard. This projects more sound, due to increased soundboard vibration. This is achieved by cutting the soundboard from a solid piece of wood, and not gluing braces by the traditional method.

To maintain strength and provide musical sustain, the neck can be dovetailed, screwed and doweled to the body, all these options are possible. This is possible due to the solid back and sides. The finger board can be cut short on the soundboard (by four frets), to allow more soundboard vibration. These frets are rarely used on an acoustic guitar, so this is an improvement. The traditional truss rod to adjust the neck is included in this design.

The Bridge can also be longer, and provides more vibration to the soundboard. This is possible, because the underside of the bride is relieved (cut away). This allows more contact over a greater length with the soundboard, but does not increase the actual square inch contact area by a great amount.

String height (action), is completely different and improved. Almost all acoustic guitars have a fixed nut and fixed saddle. While the saddle can be adjusted with shims, this is not effective to adjust action. String height is very important, as it affects tone, string noise (buzz), and the ability to play with less effort. It also affects the ability to play slide guitar, which is a great technique on the acoustic guitar. The nut is recessed into a pocket, which allows it to be free standing, and adjustable. This can be achieved by suppling ten different nut components as required, all of different height. There are also ten different saddle components, all of different height. The combination of these different nut and saddle heights allows string action adjustment never seen before.

This guitar has been completely prototyped as a virtual design (complete digital 3D computer aided design, available for view upon request). The goal is to license this idea to people that understand guitar building, or sell it to an established guitar manufacturer that can produce this product.

SUMMARY OF INVENTION

This is an acoustic guitar that produces much higher volume and improved tone at this higher volume, due to capturing one quarter wavelength of the lowest frequency, while being played with much less effort (less distortion). This can be achieved with batteries, which makes this a guitar that can be played anywhere, without the need for electrical power and equipment. Guitar players all over the world love to pick up a guitar and play anywhere. They also want to control the volume without cumbersome electrical equipment. This guitar has two channels, allowing guitar playing and singing through the guitar simultaneously, for songwriters and performers to take advantage of at any time. This guitar can also be used as a stereo, as any smartphone can be plugged into the guitar electronics, and played through the guitar waveguides, which greatly boosts volume, and significantly improves the tone of any smartphone. This also allows the guitar player the option to play along with their favorite songs on the smartphone, with headphones also an option. This guitar has been redesigned many times, due to design and build prototyping. Testing of partially built guitar includes: component strength testing, validation of previous patent concepts, acoustic testing of guitar assembly with very encouraging results, electronics testing, and component packaging regarding fit and function. Also considered are tonewood conditions such as kiln drying, adhesive strength of bond, water absorption, warping, and stability during machining. Wood conditions for fitting, screwing, doweling, sanding, staining and polishing have also been considered, tested and improved.

DRAWINGS OF INVENTION

All manufactured components of this instrument are completely detailed in drawings, and are available for review. This product is modeled in a 3D CAD system for design, and computer numerical controlled (CNC) manufacturing. 100% of all components are included, right down to mother of pearl inlay. All components can be programmed from this solid model for manufacturing. This project considers design for manufacturing (DFM) methods, to eliminate redesign during manufacturing.

BRIEF DESCRIPTION OF THE DRAWINGS

FIG. 8—Guitar body top perspective view from FIG. 1 (sheet 4).

FIG. 9—Electronics assembly top perspective view from FIG. 1 (sheet 4).

FIG. 10—Chamber divider top perspective view, which is purposely missing from FIG. 1 (sheet 4).

FIG. 11—Neck assembly top perspective view from FIG. 1 (sheet 4).

FIG. 12—Fingerboard top perspective view from FIG. 1 (sheet 4).

DETAILED DESCRIPTION

Figure 1:
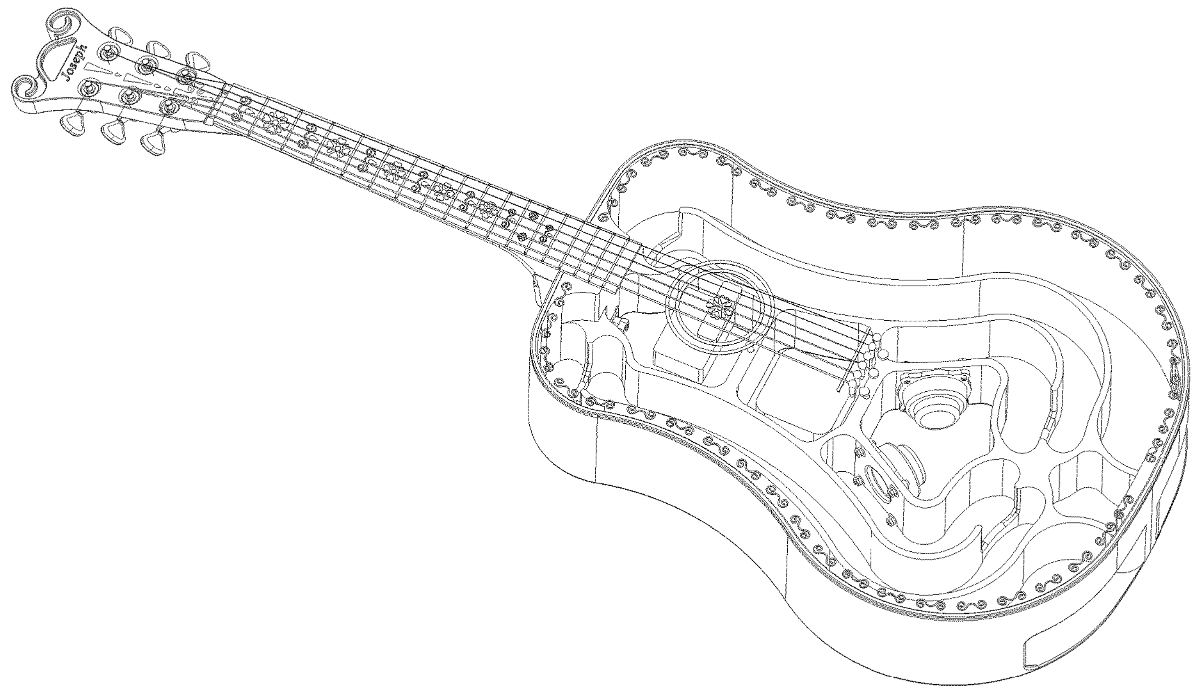
FIG. 1—Complete assembly with light yet strong soundboard and chamber divider removed (sheet 1).

Referring now to the drawings: FIG. 1 illustrates an acoustic waveguide guitar with a back, and a side, all machined from a solid piece of wood to form a guitar body 2, (two 3"×18"×24" laminated maple or other wood blocks joined by bonded adhesive). This includes two internal waveguides, built into the guitar body 2, which are machined into this solid piece using the well-known computer numerical controlled machining process. All components have been reviewed for DFM (design for manufacturing), so the machining process does not have any unknown complications. The light yet strong soundboard 1 is not shown for clarity, the neck 3, is shown connected to the guitar body 2, and also connected to the fingerboard 4. These and all other components, are shown in greater detail in additional FIGURES for clarity. Note that six strings are shown, which should be light gage, to avoid excessive force on soundboard. These are standard strings that can be purchased at any music store, and are installed the same as any other acoustic guitar.

Figure 2:
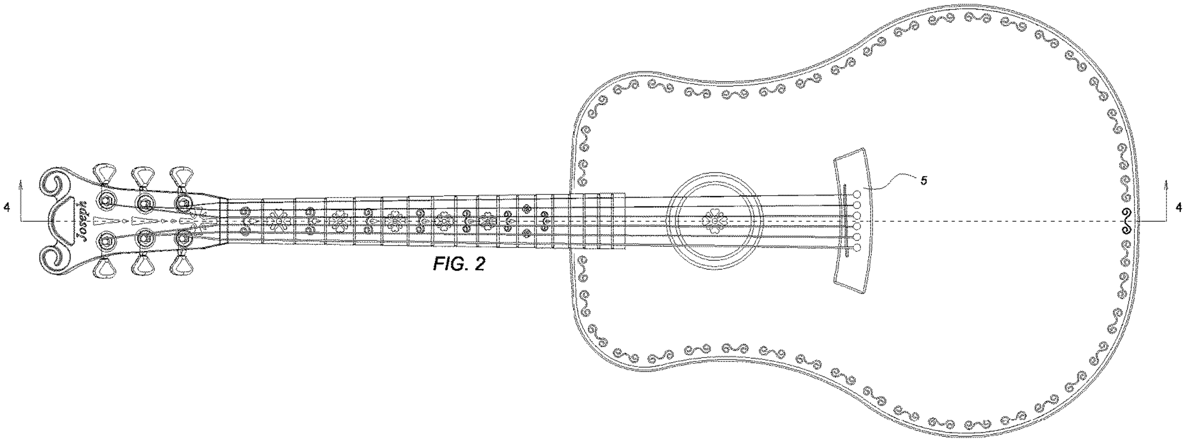
FIG. 2—Top view (sheet 2).

FIG. 2 shows the guitar top assembly view, which section 4-4 is taken from. The bridge 5, is shown. This bridge is attached to the light yet strong soundboard 1, to assist in greater vibration of light yet strong soundboard 1.

Figure 3:
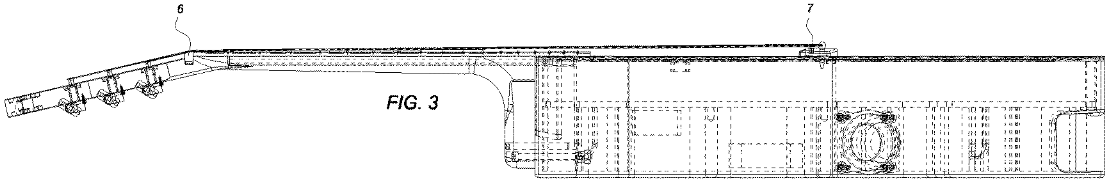
FIG. 3—Front view from FIG. 2 (sheet 2).

FIG. 3 shows light yet strong soundboard 1 is attached to the guitar body 2 with wood adhesive, and button head screws are also an option. Nut 6 and saddle 7 are also shown.

Figure 4:
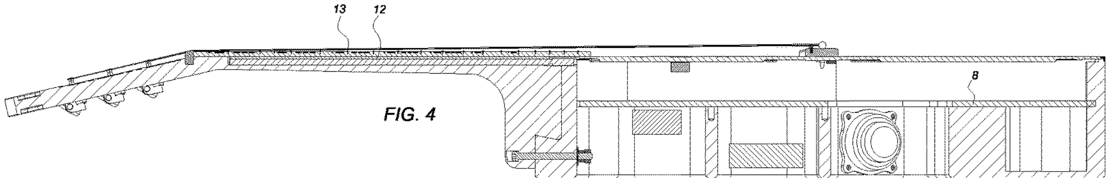
FIG. 4—Section 4-4 from FIG. 2 (sheet 2).

FIG. 4 (section 4-4 from sheet 2, FIG. 2) shows overall height of guitar, chamber divider 8, truss rod 12, and fret(s) 13.

Figure 5:
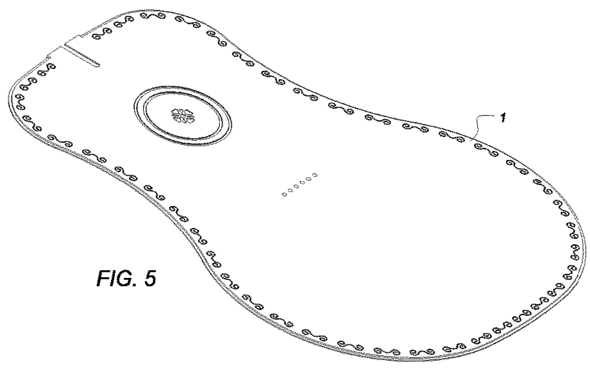
FIG. 5—Light yet strong soundboard top perspective view, which is purposely missing from FIG. 1 for clarity (sheet 3).

FIG. 5 shows top perspective view of light yet strong soundboard 1. This was omitted from FIG. 1 for clarity.

Figure 6:
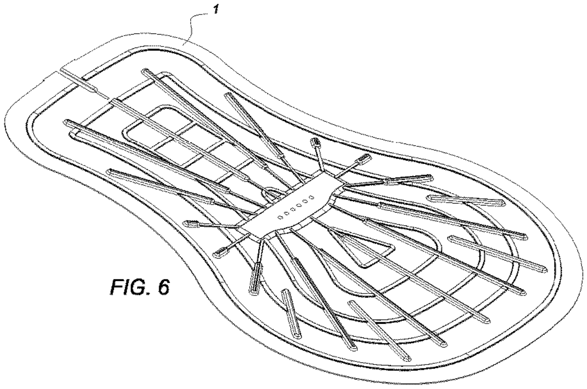
FIG. 6—Light yet strong soundboard bottom perspective view, which is flipped 180 degrees from FIG. 5 (sheet 3).

FIG. 6 shows bottom perspective view of light yet strong soundboard 1 (flipped 180 degrees from FIG. 5). This was omitted from FIG. 1 for clarity. Ribs are shown as machined, from a solid piece of wood.

Figure 7:
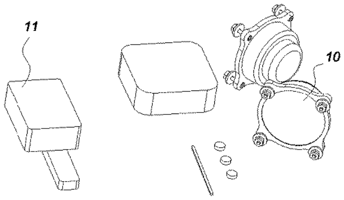
FIG. 7—Electronics assembly bottom perspective view from FIG. 1 (sheet 3).

FIG. 7 shows a bottom view of the electronics package, including Microphone 11 and Full-Range Speaker 10 (two required), which is the final electronic output signal. The acoustic sound wave then moves through left and right waveguides, as described in the "Abstract" and "Background of Invention". These sound waves lose very little sound energy. They exit the end of the waveguides with greater volume and exceptional tone, due to moving through the Rock Maple waveguides only. The actual waveguide "space" is created by the assembly of the guitar body 2, and chamber divider 8. These sound waves can provide output to an external microphone, PA system, or any other device. If this alternative connection is used, or if no electrical connection is used, this acoustic guitar still provides a louder sound, due to the larger and thinner light yet strong soundboard.

FIG. 8 shows the guitar body 2 top perspective view (from FIG. 1) without other components for clarity.

FIG. 9 is the electronics and neck component assembly top perspective view (from FIG. 1). This shows two steel dowels 16, socket head cap screw 17, lock nut 18, and steel washer 19, which all connect to the neck 3 (shown in FIG. 11), and also to the guitar body 2 (shown in FIG. 8). Also shown are amplifier 20, under saddle piezo pickup 21, transducer pickup 22, and under string pickup 23.

FIG. 10 shows top perspective view of chamber divider 8, without other components for clarity. This prevents feedback from pickups to speakers. Center opening is optional.

FIG. 11 shows the neck 3 top perspective view (from FIG. 1) without other components for clarity. Note machined slot for truss rod.

FIG. 12 shows fingerboard 4, from (from FIG. 1).

Figure 13:
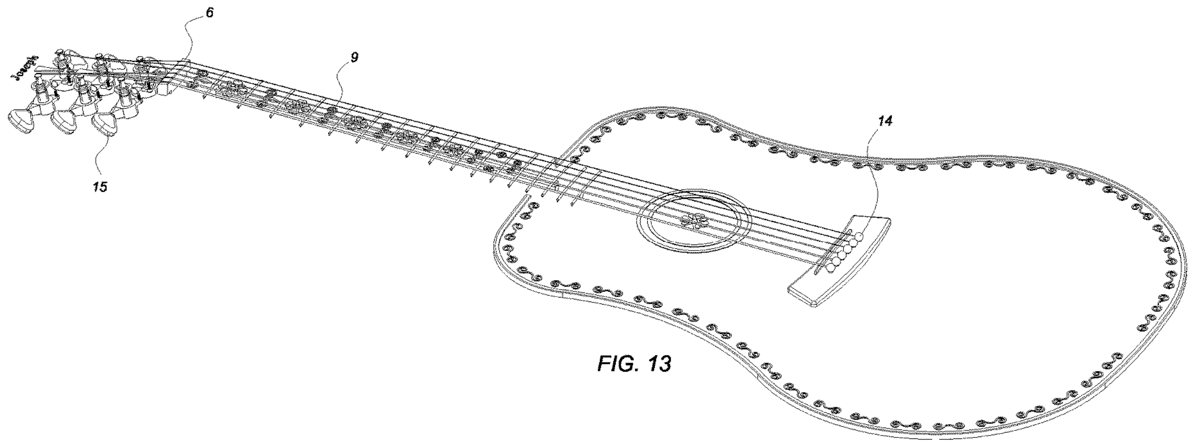
FIG. 13—Miscellaneous components top perspective view from FIG. 1 (sheet 5).

FIG. 13 (from FIG. 1) shows top perspective view of six string pins 14 (known standard component) that attaches the strings to the bridge. Also shown is nut 6 for clarity, and six tuning heads 15, which are attached to the neck. Drill size, tap size and location will be added to suit, based on actual component brand (known standard component). In addition, optional mother of pearl decorative custom hand worked detailing 9, is shown on the neck if desired.

I claim:

1. An acoustic guitar, comprising: a back, a side, an internal waveguide, machined from a solid piece of wood to form a guitar body;

an internal chamber divider attached to said guitar body;

an internal speaker, attached mechanically to said guitar body, attached electronically to an internal electronics package, a microphone, and a plurality of pickups;

said microphone attached to said internal chamber divider or said guitar body;

said pickups attached to said internal chamber divider, or said guitar body;

said internal electronics package attached to said guitar body;

an elongated neck attached to said guitar body;

a light yet strong soundboard attached to said guitar body;
a bridge attached to said light yet strong soundboard;
an adjustable nut attached to said elongated neck;
an adjustable saddle attached to said bridge;
said pickups attached to said bridge and said saddle;
a guitar string set attached to said bridge, said adjustable saddle, said adjustable nut and said elongated neck.

2. The acoustic guitar of claim 1, wherein said guitar body includes an opening allowing sound to travel from said internal speaker into said internal waveguide.

3. The acoustic guitar of claim 1, wherein said internal chamber divider fits on top of said internal waveguide of said guitar body, providing a passage for said sound from said internal speaker, preventing loss of said sound, due to said sound containment through said internal waveguide, to outside environment.

4. The acoustic guitar of claim 1, wherein said internal electronics package is battery powered, and is accessible from said back of said acoustic guitar.

5. The acoustic guitar of claim 1, wherein said microphone or said pickups and said internal electronics package provides said sound output through said internal speaker and said internal waveguide.

6. The acoustic guitar of claim 1, wherein said light yet strong soundboard is attached to said guitar body, with an adhesive or screws, comprising: said light yet strong soundboard machined from a solid piece of wood, allowing said light yet strong soundboard to be configured with small but strong ribs, which provides light weight and increased strength, resulting in increased vibration and a greater amount of air displacement, which increases volume.

* * * * *